(12) United States Patent
Ramirez Corredores et al.

(10) Patent No.: US 9,850,440 B2
(45) Date of Patent: *Dec. 26, 2017

(54) PRODUCTION OF RENEWABLE BIO-GASOLINE

(71) Applicant: KiOR, Inc., Pasadena, TX (US)

(72) Inventors: Maria Magdalena Ramirez Corredores, Houston, TX (US); Vicente Sanchez Iglesias, Houston, TX (US)

(73) Assignee: Inaeris Technologies, LLC, Pasadena, TX (US)

( * ) Notice: Subject to any disclaimer, the term of this patent is extended or adjusted under 35 U.S.C. 154(b) by 84 days.

This patent is subject to a terminal disclaimer.

(21) Appl. No.: 14/694,559

(22) Filed: Apr. 23, 2015

(65) Prior Publication Data

US 2015/0225661 A1    Aug. 13, 2015

Related U.S. Application Data

(62) Division of application No. 12/915,732, filed on Oct. 29, 2010, now Pat. No. 9,062,264.

(51) Int. Cl.
*C10L 1/18* (2006.01)
*C10L 1/24* (2006.01)
(Continued)

(52) U.S. Cl.
CPC .............. *C10L 1/18* (2013.01); *C10B 53/02* (2013.01); *C10L 1/023* (2013.01); *C11C 1/08* (2013.01);
(Continued)

(58) Field of Classification Search
CPC .......... C10L 1/1616; C10L 1/023; C10L 1/18; C10L 1/1817; C10L 1/1832;
(Continued)

(56) References Cited

U.S. PATENT DOCUMENTS 4,209,647 A    6/1980 Gallivan et al.
4,645,585 A    2/1987 White
(Continued)

FOREIGN PATENT DOCUMENTS

EP    0718392    6/1996
EP    1719811    11/2006
(Continued)

OTHER PUBLICATIONS

Hilten et al., Comparison of Three Accelerated Aging Procedures to Assess Bio-oil Stability, Fuel 89, Mar. 17, 2010, pp. 2741-2749.
(Continued)

*Primary Examiner* — Latosha Hines
(74) *Attorney, Agent, or Firm* — Hovey Williams LLP

(57) ABSTRACT

A process and system for separating bio-gasoline, bio-diesel and bio-fuel oil fractions from a bio-oil, and for producing a renewable gasoline including at least in part the bio-gasoline fraction, is provided. The process comprises separating bio-oil into a bio-gasoline fraction and a heavy fraction based on their boiling points. At least a portion of the bio-gasoline fraction is directly blended with a petroleum-derived gasoline, without any prior hydrotreatment, to thereby provide a renewable gasoline composition.

23 Claims, 1 Drawing Sheet

(51) Int. Cl.
*C10L 1/02* (2006.01)
*C10B 53/02* (2006.01)
*C11C 1/08* (2006.01)
*C11C 1/10* (2006.01)
*C11C 3/00* (2006.01)
*C10L 1/16* (2006.01)
*C10L 1/183* (2006.01)
*C10L 1/185* (2006.01)
*C10B 49/22* (2006.01)

(52) U.S. Cl.
CPC .............. *C11C 1/10* (2013.01); *C11C 3/00* (2013.01); *C10B 49/22* (2013.01); *C10L 1/1616* (2013.01); *C10L 1/1817* (2013.01); *C10L 1/1832* (2013.01); *C10L 1/1855* (2013.01); *C10L 2200/0423* (2013.01); *C10L 2200/0469* (2013.01); *C10L 2270/023* (2013.01); *C10L 2290/02* (2013.01); *C10L 2290/10* (2013.01); *C10L 2290/12* (2013.01); *C10L 2290/24* (2013.01); *C10L 2290/52* (2013.01); *C10L 2290/543* (2013.01); *Y02E 50/13* (2013.01); *Y02E 50/14* (2013.01); *Y02P 20/145* (2015.11); *Y02P 30/20* (2015.11)

(58) Field of Classification Search
CPC ........... C10L 1/1855; C10L 2200/0423; C10L 2200/0469; C10L 2270/023; C10L 2290/02; C10L 2290/10; C10L 2290/12; C10L 2290/24; C10L 2290/52; C10L 2290/543; Y02E 50/13; Y02E 50/14; C11C 1/08; C11C 1/10; C11C 3/00; Y02P 20/145; Y02P 30/20; C10B 49/22; C10B 53/02
USPC ......................................................... 44/352
See application file for complete search history.

(56) References Cited

U.S. PATENT DOCUMENTS

| | | | |
|---|---|---|---|
| 4,795,841 | A | 1/1989 | Elliott et al. |
| 5,820,640 | A | 10/1998 | Ikura et al. |
| 7,262,331 | B2 | 8/2007 | Van de Beld et al. |
| 7,279,018 | B2 | 10/2007 | Jakkula et al. |
| 7,425,657 | B1 | 9/2008 | Elliott et al. |
| 7,638,314 | B2 | 12/2009 | Zappi et al. |
| 2003/0115792 | A1 | 6/2003 | Shabtai et al. |
| 2007/0261296 | A1 | 11/2007 | Adams et al. |
| 2008/0006520 | A1 | 1/2008 | Badger et al. |
| 2008/0050792 | A1 | 2/2008 | Zmierczak et al. |
| 2008/0300434 | A1 | 12/2008 | Cortright et al. |
| 2008/0312476 | A1 | 12/2008 | McCall |
| 2009/0065378 | A1 | 3/2009 | Maas |
| 2009/0166256 | A1 | 7/2009 | Lewis et al. |
| 2009/0227823 | A1 | 9/2009 | Huber et al. |
| 2009/0229173 | A1 | 9/2009 | Gosling |
| 2009/0250376 | A1 | 10/2009 | Brandvold et al. |
| 2009/0253947 | A1 | 10/2009 | Brandvold et al. |
| 2009/0253948 | A1 | 10/2009 | McCall et al. |
| 2009/0259082 | A1 | 10/2009 | Deluge et al. |
| 2009/0294324 | A1 | 12/2009 | Brandvold et al. |
| 2009/0301930 | A1 | 12/2009 | Brandvold et al. |
| 2009/0318737 | A1 | 12/2009 | Luebke |
| 2010/0212215 | A1* | 8/2010 | Agblevor ............... C10B 53/02 44/300 |
| 2010/0218417 | A1* | 9/2010 | Bauldreay ............... C10L 1/02 44/438 |
| 2010/0256428 | A1 | 10/2010 | Marker et al. |

FOREIGN PATENT DOCUMENTS

| | | |
|---|---|---|
| EP | 2107100 | 10/2009 |
| WO | 2006037368 | 4/2006 |
| WO | 2007128798 | 11/2007 |
| WO | 2007128800 | 11/2007 |
| WO | 2009014859 | 1/2009 |
| WO | 2009126508 | 10/2009 |
| WO | 2010002792 | 1/2010 |
| WO | 2010008686 | 1/2010 |
| WO | 2010033512 | 3/2010 |

OTHER PUBLICATIONS

Ikura et al., Emulsification of pyrolysis derived bio-oil in diesel fuel, Biomass & BioEnergy 24, 2003, pp. 221-232.

Chiaramonti et al., Development of emulsions from biomass pyrolysis liquid and diesel and their use in engines—Part 1: emulsion production, Biomass & Bioenergy 25, 2003, pp. 85-99.

Qi et al., Review of biomass pyrolysis oil properties and upgrading research, Energy Conversion & Management 48, 2007, pp. 87-92.

Garcia-Perez et al., Production and fuel properties of fast pyrolysis oil/bio-diesel blends, Fuel Processing Technology 91, 2010, pp. 296-305.

Ringer et al., Large-Scale Pyrolysis Oil Production: A Technology Assessment and Economic Analysis, NREL Technical Report, NREL/TP-510-37779, Nov. 2006, 93 Pages.

Czernik et al., Stability of Wood Fast Pyrolysis Oil, Biomass and Bioenergy, vol. 7, Nos. 1-6, pp. 187-192.

Mahinpey et al., Analysis of Bio-Oil, Biogas, and Biochar from Pressurized Pyrolysis of Wheat Straw Using a Tubular Reactor, Energy & Fuels, 2009, 23, pp. 2736-2742.

Czernik et al., Overview of Applications of Biomass Fast Pyrolysis Oil, Energy & Fuels, 2004, 18, pp. 590-598.

Oasmaa et al., Fast Pyrolysis of Forestry Residue. 3. Storage Stability of Liquid Fuel, Energy & Fuels, 2003, 17, pp. 1075-1084.

Diebold, J.P., A Review of the Chemical and Physical Mechanisms of the Storage Stability of Fast Pyrolysis Bio-Oils, NREL/SR-570-27613, Jan. 2000, 59 Pages.

Moens et al., Study of the Neutralization and Stabilization of a Mixed Hardwood Bio-Oil, Energy & Fuels 2009, 23, pp. 2695-2699.

Chinese Office Action dated Apr. 14, 2015 for related Chinese Patent Application No. 201180052881.6, 10 pages.

Chinese Office Action dated Jun. 27, 2014 for related Chinese Patent Application No. 201180052881.6, 12 pages.

Preliminary Report on Patentability for related PCT Patent Application No. PCT/US2011/055355, International Filing Date of Oct. 7, 2011, 16 pages.

International Search Report and Written Opinion for related PCT Patent Application No. PCT/US2011/055355, International Filing Date Oct. 7, 2011, 16 pages.

\* cited by examiner

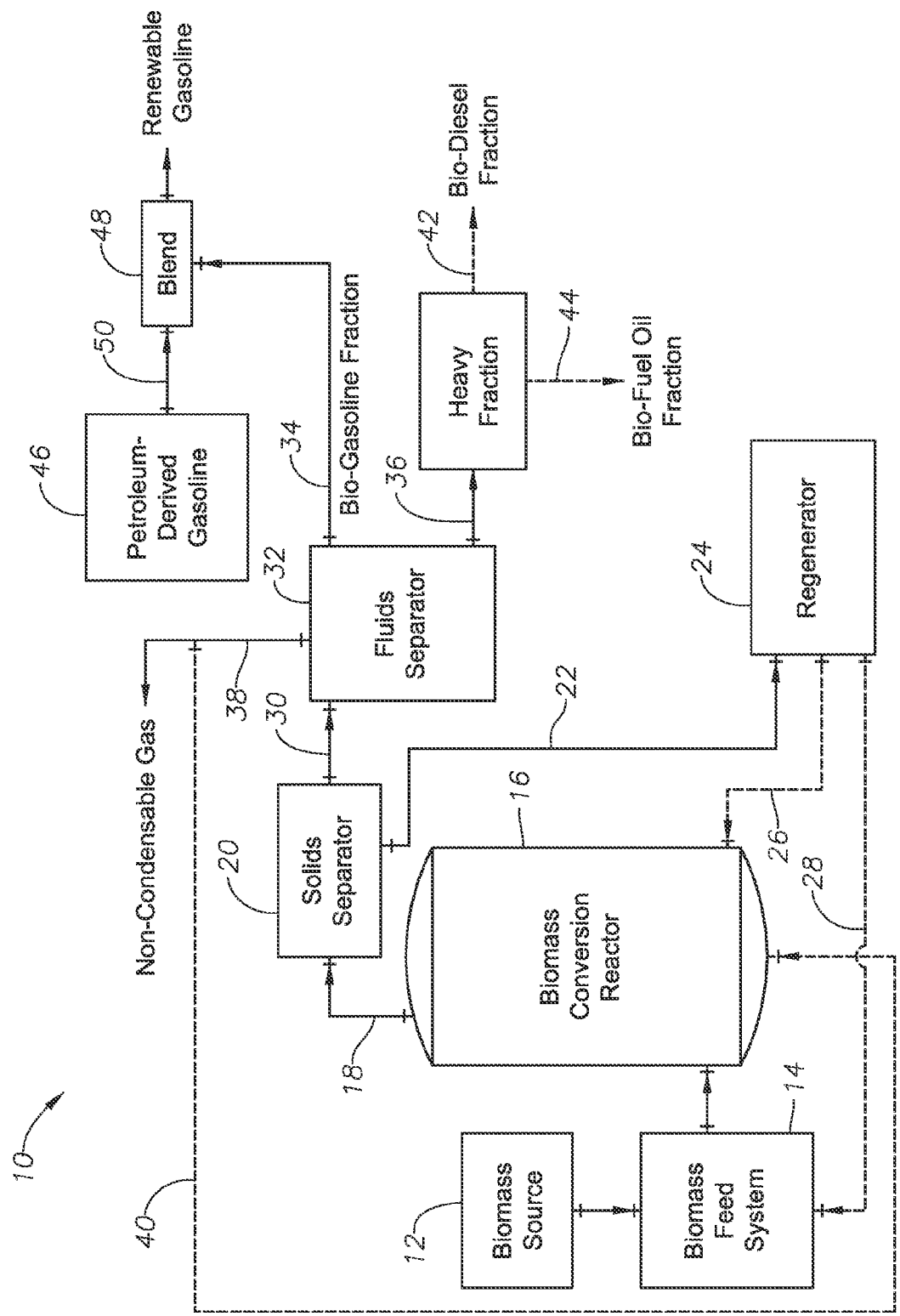

PRODUCTION OF RENEWABLE BIO-GASOLINE

RELATED APPLICATION

This application is a divisional application of U.S. patent application Ser. No. 12/915,732, filed Oct. 29, 2010, said application in its entirety being hereby incorporated by reference into the present specification.

BACKGROUND

1. Field of the Invention

The present invention relates generally to processes and systems for separating bio-gasoline, bio-diesel and bio-fuel oil fractions from a bio-oil. More specifically, the invention relates to the production of a renewable gasoline including at least in part the bio-gasoline fraction.

2. Description of the Related Art

With the rising costs and environmental concerns associated with fossil fuels, renewable energy sources have become increasingly important. The development of renewable fuel sources provides a means for reducing the dependence on fossil fuels. Accordingly, many different areas of renewable fuel research are currently being explored and developed.

With its low cost and wide availability, biomass has increasingly been emphasized as an ideal feedstock in renewable fuel research. Consequently, many different conversion processes have been developed that use biomass as a feedstock to produce useful biofuels and/or specialty chemicals. Existing biomass conversion processes include, for example, combustion, gasification, slow pyrolysis, fast pyrolysis, liquefaction, and enzymatic conversion. One of the useful products that may be derived from the aforementioned biomass conversion processes is a liquid product commonly referred to as "bio-oil." Bio-oil may be processed into transportation fuels, hydrocarbon chemicals, and/or specialty chemicals.

Despite recent advancements in biomass conversion processes, many of the existing biomass conversion processes produce low-quality bio-oils containing high amounts of oxygen which are difficult, if not impossible, to separate into various fractions. These bio-oils require extensive secondary upgrading in order to be utilized as transportation fuels and/or as fuel additives due to the high amounts of oxygen present in the bio-oil. Furthermore, these transportation fuels and/or fuel additives derived from bio-oil vary in quality depending on the original oxygen content of the bio-oil.

Accordingly, there is a need for an improved process and system for separating bio-oil into various fractions, and using such fractions as blend components of renewable fuels.

SUMMARY OF THE INVENTION

In one embodiment, the present invention is directed to a bio-gasoline fraction production process comprising: (a) converting biomass in a conversion reactor containing a catalyst to thereby produce a conversion reactor effluent comprising vapor conversion products; (b) condensing at least a portion of the vapor conversion products to thereby provide a bio-oil having a total oxygen content of less than 15 weight percent; and (c) separating the bio-oil by distillation into at least the bio-gasoline fraction, which can be used as, or blended to become, a renewable gasoline; and a heavy fraction, wherein at least 75 weight percent of the bio-gasoline fraction has a boiling point less than 205° C., and wherein at least 75 weight percent of the heavy fraction has a boiling point greater than 205° C.

In another embodiment, the present invention is directed to a renewable gasoline production process comprising: (a) separating a bio-oil into at least a bio-gasoline fraction and a heavy fraction, wherein at least 75 weight percent of the bio-gasoline fraction has a boiling point less than 205° C., wherein at least 75 weight percent of the heavy fraction has a boiling point greater than 205° C., wherein the bio-oil has not previously been subjected to an oxygen-removing hydrotreatment step; and (b) combining at least a portion of the bio-gasoline fraction with a petroleum-derived gasoline to thereby produce a renewable gasoline, wherein the renewable gasoline comprises the petroleum-derived gasoline in an amount of at least 80 weight percent and the bio-gasoline fraction in an amount greater than 0.1 and less than 20 weight percent.

In a further embodiment, the present invention is directed to a bio-gasoline composition having a total oxygen content of less than 15 weight percent and comprising phenolic compounds in an amount of at least 5 percent by weight.

In a further embodiment, the present invention is directed to a bio-gasoline composition derived from biomass and comprising hydrocarbon compounds and oxygen-and-carbon-containing compounds, wherein the cumulative amount of aliphatic and aromatic hydrocarbons in the bio-gasoline composition is at least 5 weight percent, wherein the amount of oxygen-and-carbon-containing compounds in the bio-gasoline is at least 15 weight percent, wherein the oxygen-and-carbon-containing compounds are selected from the group consisting of phenolics, furans, ketones, aldehydes, and mixtures thereof.

In a further embodiment, the present invention is directed to a renewable gasoline composition comprising hydrocarbons and oxygen-and-carbon-containing compounds in an amount of at least 100 ppmw, wherein the oxygen-and-carbon-containing compounds are selected from the group consisting of phenolics, furans, ketones, aldehydes, and mixtures thereof.

BRIEF DESCRIPTION OF THE FIGURES

FIG. 1 is a schematic diagram of a biomass conversion system according to one embodiment of the present invention.

DETAILED DESCRIPTION

FIG. 1 depicts a biomass conversion system 10 that includes a means for separating bio-oil into various fractions or fuel additives and blending the bio-gasoline fraction with a petroleum derived gasoline, as a blend stock or fuel additive, to form renewable gasoline.

It should be understood that the biomass conversion system shown in FIG. 1 is just one example of a system within which the present invention can be embodied. The present invention may find application in a wide variety of other systems where it is desirable to efficiently and effectively separate bio-oil into renewable fuels and/or fuel additives. The exemplary biomass conversion system illustrated in FIG. 1 will now be described in detail.

The biomass conversion system 10 of FIG. 1 includes a biomass source 12 for supplying a biomass feedstock to be converted to bio-oil. The biomass source 12 can be, for example, a hopper, storage bin, railcar, over-the-road trailer, or any other device that may hold or store biomass. The biomass supplied by the biomass source 12 can be in the form of solid particles. The biomass particles can be fibrous biomass materials comprising cellulose. Examples of suitable cellulose-containing materials include algae, paper waste, and/or cotton linters. In one embodiment, the biomass particles can comprise a lignocellulosic material. Examples of suitable lignocellulosic materials include forestry waste such as wood chips, saw dust, pulping waste, and tree branches; agricultural waste such as corn stover, wheat straw, and bagasse; and/or energy crops such as eucalyptus, switch grass, and coppice.

As depicted in FIG. 1, the solid biomass particles from the biomass source 12 can be supplied to a biomass feed system 14. The biomass feed system 14 can be any system capable of feeding solid particulate biomass to a biomass conversion reactor 16. While in the biomass feed system 14, the biomass material may undergo a number of pretreatments to facilitate the subsequent conversion reactions. Such pretreatments may include drying, roasting, torrefaction, demineralization, steam explosion, mechanical agitation, and/or any combination thereof.

In one embodiment, it may be desirable to combine the biomass with a catalyst in the biomass feed system 14 prior to introducing the biomass into the biomass conversion reactor 16. Alternatively, the catalyst may be introduced directly into the biomass conversion reactor 16. The catalyst may be fresh and/or regenerated catalyst. The catalyst can, for example, comprise a solid acid, such as a zeolite. Examples of suitable zeolites include ZSM-5, mordenite, beta, ferrierite, and zeolite-Y. Additionally, the catalyst may comprise a super acid. Examples of suitable super acids include sulfonated, phosphated, or fluorinated forms of zirconia, titania, alumina, silica-alumina, and/or clays. In another embodiment, the catalyst may comprise a solid base. Examples of suitable solid bases include metal oxides, metal hydroxides, and/or metal carbonates. In particular, the oxides, hydroxides, and carbonates of alkali metals, alkaline earth metals, transition metals, and/or rare earth metals are suitable. Other suitable solid bases are layered double hydroxides, mixed metal oxides, hydrotalcite, clays, and/or combinations thereof. In yet another embodiment, the catalyst can also comprise an alumina, such as alpha-alumina.

It should be noted that solid biomass materials generally contain minerals. It is recognized that some of these minerals, such as potassium carbonate, can have catalytic activity in the conversion of the biomass material.

The biomass feed system 14 introduces the biomass feedstock into a biomass conversion reactor 16. In the biomass conversion reactor 16, biomass is subjected to a conversion reaction that produces bio-oil. The biomass conversion reactor 16 can facilitate different chemical conversion reactions such as fast pyrolysis, slow pyrolysis, liquefaction, gasification, or enzymatic conversion. The biomass conversion reactor 16 can be, for example, a fluidized bed reactor, a cyclone reactor, an ablative reactor, or a riser reactor.

In one embodiment, the biomass conversion reactor 16 can be a riser reactor and the conversion reaction can be fast pyrolysis. More specifically, fast pyrolysis may include catalytic cracking. As used herein, "pyrolysis" refers to the thermochemical conversion of biomass caused by heating the feedstock in an atmosphere that is substantially free of oxygen. In one embodiment, pyrolysis is carried out in the presence of an inert gas, such as nitrogen, carbon dioxide, and/or steam. Alternatively, pyrolysis can be carried out in the presence of a reducing gas, such as hydrogen, carbon monoxide, non-condensable gases recycled from the biomass conversion process, and/or any combination thereof.

Fast pyrolysis is characterized by short residence times and rapid heating of the biomass feedstock. The residence times of the fast pyrolysis reaction can be, for example, less than 10 seconds, less than 5 seconds, or less than 2 seconds. Fast pyrolysis may occur at temperatures between 200 and 1,000° C., between 250 and 800° C., or between 300 and 600° C.

Referring again to FIG. 1, the conversion effluent 18 exiting the biomass conversion reactor 16 generally comprises gas, vapors, and solids. As used herein, the vapors produced during the conversion reaction may interchangeably be referred to as "bio-oil," which is the common name for the vapors when condensed into their liquid state. In one embodiment of the present invention, the conversion reaction carried out in the biomass conversion reactor 16 produces a bio-oil. Such bio-oil can have an oxygen content that is less than 15, 12, 10, or 8 percent by weight of the bio-oil. The oxygen content can also be greater than 0.5, 1, 3, or 5 percent by weight of the bio-oil.

When fast pyrolysis is carried out in the biomass conversion reactor 16, the conversion effluent 18 generally comprises solid particles of char, ash, and/or spent catalyst. The conversion effluent 18 can be introduced into a solids separator 20. The solids separator 20 can be any conventional device capable of separating solids from gas and vapors such as, for example, a cyclone separator or a gas filter. The solids separator 20 removes a substantial portion of the solids (e.g., spent catalysts, char, and/or heat carrier solids) from the conversion effluent 18. The solid particles 22 recovered in the solids separator 20 can be introduced into a regenerator 24 for regeneration, typically by combustion. After regeneration, at least a portion of the hot regenerated solids can be introduced directly into the biomass conversion reactor 16 via line 26. Alternatively or additionally, the hot regenerated solids can be directed via line 28 to the biomass feed system 14 for combination with the biomass feedstock prior to introduction into the biomass conversion reactor 16.

The substantially solids-free fluid stream 30, also referred to as bio-oil, exiting the solids separator 20 can then be introduced into a fluids separator 32. In one embodiment, it is preferred that the bio-oil 30 entering the fluids separator 32 has not previously been subjected to a deoxygenation process such as, for example, hydrotreating. The fluids separator 32 can be any system capable of separating the bio-oil 30 into at least a bio-gasoline fraction 34 and a heavy fraction 36. Suitable systems to be used as the fluids separator 32 include, for example, systems for affecting separation by fractional distillation, heated distillation, extraction, membrane separation, partial condensation, and/or non-heated distillation. In some cases, it may be preferred to employ heated distillation to affect separation, where such heated distillation raises the temperature of the bio-oil 30 above 100° C. As shown in FIG. 1, non-condensable gases 38 may be removed from the fluids separator 32 and, optionally, recycled via line 40 to the biomass conversion reactor 16 for use as a lift gas.

The bio-gasoline fraction 34 exiting fluids separator 32 can have a boiling range comparable to petroleum-derived gasoline. The heavy fraction 36 exiting fluids separator 32 can have a boiling range comparable to petroleum-derived distillates.

The boiling range of the bio-gasoline fraction 34 can be such that at least 75, 85, 95, or 100 weight percent of the bio-gasoline fraction 34 boils at a temperature of less than 205° C. The boiling range of the heavy fraction 36 can be such that at least 75, 85, 95, or 100 weight percent of the heavy fraction 36 boils at a temperature greater than 205° C.

The bio-gasoline fraction 34 can have a mid-boiling point in the range of 50 to 200° C., 70 to 180° C., or 80 to 160° C. As used herein, "mid-boiling point" refers to the median boiling point temperature of the relevant fraction, where 50 weight percent of the fraction boils above the mid-boiling point and 50 weight percent boils below the mid-boiling point. The heavy fraction 36 can have a mid-boiling point in the range of 210 to 700° C., 220 to 410° C., or 230 to 400° C. The heavy fraction 36 can have a mid-boiling point that is at least 100° C., 125° C., or 150° C. greater than the mid-boiling point of the bio-gasoline fraction 34.

In one embodiment, at least 5, 10, or 20 weight percent of the bio-oil 30 entering the fluids separator 32 is separated into the bio-gasoline fraction 34. In another embodiment at least 10, 20, or 30 weight percent and/or no more than 90, 85, or 80 weight percent of the bio-oil 30 entering the fluids separator 32 is separated into the heavy fraction 36. Additionally, both the bio-gasoline fraction 34 and the heavy fraction 36 can have an oxygen content that is less than 12, 10, 8, or 6 weight percent.

Referring again to FIG. 1, the heavy fraction 36 removed from the fluids separator 32 can be further separated into a bio-diesel fraction 42 and a bio-fuel oil fraction 44. Preferably, at least 75 weight percent of the bio-diesel fraction 42 has a boiling point between 205° C. and 325° C., and at least 5 weight percent of the bio-oil 30 subjected to separation is separated into the bio-diesel fraction 42.

Preferably, at least 75 weight percent of the bio-fuel oil fraction 44 has a boiling point greater than 325° C., and less than 60 weight percent of the bio-oil 30 subjected to separation is separated into the bio-fuel oil fraction 44.

As illustrated in FIG. 1, biomass production system 10 can be located near or connected by a transportation system with a petroleum-derived gasoline source 46. Petroleum-derived gasoline source 46 can be, for example, a petroleum refinery, a petroleum fuel storage facility, and/or a petroleum fuel transportation system.

A gasoline blending system 48 can be used to combine a petroleum-derived gasoline 50, which can have between 5 and 12 carbon atoms per molecule, from gasoline source 46 with at least a portion of the bio-gasoline fraction 34 to thereby produce a renewable gasoline composition. The renewable gasoline composition can comprise the petroleum-derived gasoline 50 in an amount of at least 80, 85, 90, or 95 weight percent and/or at most 99.5, 99, 98, or 96 weight percent; and the bio-gasoline fraction 34 in an amount of at least 0.1, 0.5, or 1 weight percent and/or at most 20, 15, 10, or 5 weight percent.

Bio-Gasoline Fraction/Composition

The bio-gasoline fraction, which can also be referred to as a bio-gasoline composition, can comprise hydrocarbon compounds and oxygen-and-carbon-containing compounds, wherein the cumulative amount of aliphatic and aromatic hydrocarbons in the bio-gasoline fraction is at least 5, 10, or 15 weight percent. The amount of oxygen-and-carbon-containing compounds in the bio-gasoline fraction can be at least 15, 35, 40, 45 weight percent, and can also be less than 77, 66, 60, or 55 weight percent. The oxygen-and-carbon-containing compounds are preferably selected from the group consisting of phenolics, furans, ketones, aldehydes, and mixtures thereof. The concentration of the oxygen-and-carbon-containing compounds which are non-phenolic and non-furan in the bio-gasoline composition can be less than 20 weight percent.

The bio-gasoline fraction can have a total oxygen content of less than 15, 12, 10, or 8 weight percent and/or at least 0.5, 1, or 4 weight percent.

In addition, less than 1 percent of the oxygen present in the bio-gasoline composition is carbonyl oxygen, the bio-gasoline fraction can comprise less than 25 ppmw sulfur, can comprise phenolics in an amount of at least 5, or 10 weight percent, can comprise furans in an amount of at least 1 weight percent, can comprise ketones in an amount less than 10 weight percent, and can comprise aldehydes in an amount less than 10 weight percent. Phenolics and furans can account for at least 50 weight percent of the total oxygenates in the bio-gasoline composition, and aromatics can account for at least 5 weight percent of the total hydrocarbons in the bio-gasoline composition. Single-ring aromatics can account for at least 10 weight percent of the total aromatics in the bio-gasoline composition, and aromatics with more than one ring can account for less than 10 weight percent of the total aromatics in the bio-gasoline composition. Aliphatics can account for less than 25 weight percent of the total hydrocarbons in the bio-gasoline composition. The bio-gasoline composition can comprise hydrocarbons selected from the group consisting of benzene, toluene, ethylbenzene, xylene, indanes, indenes, and naphthalenes. The bio-gasoline composition can also be fully miscible with petroleum-derived gasoline.

The bio-gasoline fraction/composition preferably has a copper corrosion test maximum value of No. 1, as measured by ASTM D130 method.

Renewable Gasoline

The renewable gasoline composition can comprise the petroleum-derived gasoline in an amount of at least 80 weight percent and the bio-gasoline fraction in an amount greater than 0.1 and less than 20 weight percent.

The renewable gasoline composition comprises mainly hydrocarbons and in addition comprises oxygen-and-carbon-containing compounds in an amount of at least 100, 200, 500, 1000 ppmw, wherein the oxygen-and-carbon-containing compounds are selected from the group consisting phenolics, furans, ketones, aldehydes, and mixtures thereof. Preferably, less than 0.2 percent of the oxygen present in the renewable gasoline composition is carbonyl oxygen. The renewable gasoline composition can also comprise less than 100 ppmw sulfur, can comprise at least 0.5, 3.5, or 5.0 weight percent phenolics, can comprise preferably less than 1000 ppmw carbonyls, can comprise furans in an amount of at least 0.2 weight percent, can comprise ketones in an amount less than 2 weight percent, and can comprise aldehydes in an amount less than 2 weight percent.

The phenolics and furans can account for at least 5 weight percent of the total of the oxygen-and-carbon-containing compounds in the renewable gasoline composition, and the concentration of the oxygen-and-carbon-containing compounds which are non-phenolic and non-furan in the renewable gasoline composition can be less than 2 weight percent.

The renewable gasoline composition can comprise hydrocarbons selected from the group consisting of benzene, toluene, ethylbenzene, xylene, indanes, indenes, and naphthalenes. The renewable gasoline composition can have a copper corrosion test maximum value of No. 1.

The Anti-Knock Index (AKI), which is defined as the average of the Research Octane Number and the Motor Octane Number—[(RON+MON)/2], for the renewable gasoline composition can increase by 0.3 to 0.45, or 0.35 to 0.4 AKI numbers, as compared to the AKI of the petroleum-derived gasoline, for each one volume % increase in concentration of the bio-gasoline fraction in the renewable gasoline composition, based on the total volume of the renewable gasoline composition.

EXAMPLES

Example 1

A low oxygen bio-oil was produced from the conversion of southern yellow pine wood particles by pyrolysis in the presence of a catalyst in a riser reactor operated at a reactor outlet temperature of 640° C. The resulting bio-oil had an oxygen content of 12 weight percent, and was distilled to yield more than 25 weight percent of a bio-gasoline fraction boiling in the range of less than 215° C. The composition of the bio-gasoline fraction is shown below in Table 1.

TABLE 1

| | wt % |
|---|---|
| Cyclics/Aromatics | |
| Cyclic dienes | 0.00 |
| BTEX | 16.94 |
| Other 1-Ring Aromatics | 11.96 |
| Indanes/Indenes | 13.42 |
| Naphthalenes | 5.94 |
| 3-Ring | 0.00 |
| 4-Ring | 0.00 |
| 5-Ring | 0.00 |
| 6-Ring | 0.00 |
| Total | 48.26 |
| Nitrogen Compounds | |
| Indazoles | 0.00 |
| Oxygenates | |
| Alcohols | 0.00 |
| Ethers | 0.00 |
| Carboxylic Acids | 0.00 |
| Aldehydes | 0.00 |
| Ketones | 0.39 |
| Phenols | 43.40 |
| Diols | 0.00 |
| Indenols | 0.00 |
| BenzoFurans | 7.95 |

TABLE 1-continued

| | wt % |
|---|---|
| Naphthols | 0.00 |
| Levoglucosan | 0.00 |
| Total | 51.74 |
| Total [O] (%) | 12.00 |
| Total [S] (ppm) | 23.17 |

As can be seen from the data, the bio-gasoline fraction is of high quality, having a low oxygen content, undetectable carboxylic acids, and significant amounts of cyclic/aromatics.

Example 2

Quantities of the bio-gasoline fraction from Example 1 were blended with conventional petroleum-derived gasoline having an AKI of 87.7. The AKI was determined for the various blends, and the results of the blending are reflected in Table 2 below.

As can be seen from Table 2, the addition of the bio-gasoline fraction acts as an octane booster for the resulting renewable gasoline blend.

TABLE 2

| Volume % Bio-Gasoline Fraction in Renewable Gasoline Blend | AKI Value |
|---|---|
| 1 | 88.05 |
| 2 | 88.45 |
| 4 | 89.2 |

Example 3

Quantities of the bio-gasoline fraction from Example 1 were blended with conventional gasoline. The conventional gasoline and the various blends were tested for various properties/components. The results of such tests are reflected in Table 3 below.

TABLE 3

| Specification | Test Method | Value/Range | Renewable gasoline | |
|---|---|---|---|---|
| Biogasoline, vol % in Blend | | | 1 | 5 |
| Oxygen in biogasoline, wt % | | | 15 | 12 |
| Sulfur, ppm (max) | D 1266, D 2622, D 3120, D 5453, D 6920, or D 7039. | 80 | 15 | 18 |
| Benzene, vol % (max) | D 3606 | 1 | 0.50 | 0.57 |
| Oxygen, wt %(max) | D 4815, D 5599, or D 5845. | 2.7 | 0.07 | 0.35 |
| RVP, psi (max) Winter | D4953, D 5190, D 5191, D5482, or D 6378. | 13.5 | 10.08 | — |
| Oxidation Stability, (min) | D 525 | 240 | >240 | >720 |
| Solvent-washed Gum Content, mg/100 mL, (max) | D 381 | 5 | <0.5 | 5 |
| Copper Strip Corrosion, (max) | D 130 | No. 1 | No. 1 | No. 1 |

As can be seen from Table 3 above, the blending properties of the bio-gasoline/conventional gasoline blends are overall significantly improved with the use of a lower oxygen content bio-gasoline fraction blend stock.

The preferred forms of the invention described above are to be used as illustration only, and should not be used in a limiting sense to interpret the scope of the present invention. Modifications to the exemplary embodiments, set forth above, could be readily made by those skilled in the art without departing from the spirit of the present invention.

It is the inventors' intent to rely on the Doctrine of Equivalents to determine and assess the reasonably fair scope of the present invention as it pertains to any processes and systems not materially departing from but outside the literal scope of the invention as set forth in the following claims.

What is claimed is:

1. A process for producing a bio-gasoline fraction, said process comprising:
   (a) converting biomass in a conversion reactor containing a catalyst to thereby produce a conversion reactor effluent comprising vapor conversion products;
   (b) condensing at least a portion of said vapor conversion products to thereby provide a bio-oil having a total oxygen content of less than 15 weight percent; and
   (c) separating said bio-oil by distillation into at least a bio-gasoline fraction and a heavy fraction, wherein at least 75 weight percent of said bio-gasoline fraction has a boiling point less than 205° C., and wherein at least 75 weight percent of said heavy fraction has a boiling point greater than 205° C.

2. The process of claim 1 wherein said bio-oil has a total oxygen content of less than 15 weight percent; and wherein at least 85 weight percent of said bio-gasoline fraction has a boiling point less than 205° C., and wherein at least 85 weight percent of said heavy fraction has a boiling point greater than 205° C.

3. The process of claim 1 wherein at least 5 weight percent of said bio-oil subjected to said separating of step (c) is separated into said bio-gasoline fraction.

4. The process of claim 1 wherein said separating of step (c) is accomplished by fractional distillation.

5. The process of claim 1 wherein said separating of step (c) further provides separation of a bio-diesel fraction from said heavy fraction, and wherein at least 75 weight percent of said bio-diesel fraction has a boiling point between 205° C. and 325° C.

6. The process of claim 5 wherein at least 5 weight percent of said bio-oil subjected to said separating of step (c) is separated into said bio-diesel fraction.

7. The process of claim 1 wherein said separating of step (c) further provides separation of a bio-fuel oil fraction from said heavy fraction, and wherein at least 75 weight percent of said bio-fuel oil fraction has a boiling point greater than 325° C.

8. The process of claim 7 wherein less than 60 weight percent of said bio-oil subjected to said separating of step (b) is separated into said bio-fuel oil fraction.

9. The process of claim 1 wherein said bio-oil is not subjected to additional deoxygenation between said converting of step (a) and said separating of step (c).

10. The process of claim 1 wherein said bio-gasoline fraction comprises phenolic compounds in an amount of at least 5 percent by weight.

11. The process of claim 1 wherein said bio-gasoline fraction comprises hydrocarbon compounds and oxygen-and-carbon-containing compounds, wherein the cumulative amount of aliphatic and aromatic hydrocarbons in said bio-gasoline fraction is at least 5 weight percent, wherein the amount of said oxygen-and-carbon-containing compounds in said bio-gasoline fraction is at least 15 weight percent, wherein said oxygen-and-carbon-containing compounds are selected from the group consisting of phenolics, furans, ketones, aldehydes, and mixtures thereof.

12. A process for producing a renewable gasoline composition, said process comprising:
   (a) separating a bio-oil into at least a bio-gasoline fraction and a heavy fraction, wherein at least 75 weight percent of said bio-gasoline fraction has a boiling point less than 205° C., wherein at least 75 weight percent of said heavy fraction has a boiling point greater than 205° C., wherein said bio-oil has not previously been subjected to an oxygen-removing hydrotreatment step, wherein said bio-oil has a total oxygen content of less than 15 weight percent; and
   (b) combining at least a portion of said bio-gasoline fraction with a petroleum-derived gasoline to thereby produce a renewable gasoline composition, wherein said renewable gasoline composition comprises said petroleum-derived gasoline in an amount of at least 80 weight percent and said bio-gasoline fraction in an amount greater than 0.1 and less than 20 weight percent.

13. The process of claim 12 wherein said petroleum-derived gasoline comprises hydrocarbons having between 5 and 12 carbon atoms per molecule.

14. The process of claim 12 wherein at least 5 weight percent of said bio-oil subjected to said separating of step (a) is separated into said bio-gasoline fraction.

15. The process of claim 12 wherein said bio-oil results from the thermochemical conversion of biomass in the presence of a catalyst.

16. The process of claim 12 wherein said bio-gasoline fraction comprises phenolic compounds in an amount of at least 5 percent by weight.

17. The process of claim 12 wherein said bio-gasoline fraction comprises hydrocarbon compounds and oxygen-and-carbon-containing compounds, wherein the cumulative amount of aliphatic and aromatic hydrocarbons in said bio-gasoline fraction is at least 5 weight percent, wherein the amount of oxygen-and-carbon-containing compounds in said bio-gasoline fraction is at least 15 weight percent, wherein said oxygen-and-carbon-containing compounds are selected from the group consisting of phenolics, furans, ketones, aldehydes, and mixtures thereof.

18. The process of claim 17 wherein the Anti-Knock Index (AKI) for said renewable gasoline composition increases by 0.3 to 0.45 AKI numbers, as compared to the AKI of said petroleum-derived gasoline, for each one volume % increase in concentration of said bio-gasoline fraction in said renewable gasoline composition, based on the total volume of said renewable gasoline composition.

19. The process of claim 12 wherein said renewable gasoline composition comprises at least 0.5 weight percent phenolics, and at least 50 ppmw carbonyls.

20. The process of claim 12 wherein said renewable gasoline composition has a copper corrosion test maximum value of No. 1.

21. The process of claim 12 wherein said bio-gasoline fraction is fully miscible with said petroleum-derived gasoline.

22. The process of claim 1, wherein said bio-gasoline fraction comprises:

(i) a total oxygen content of less than 15 weight percent, and
(ii) phenolic compounds in an amount of at least 10 percent by weight.

23. The process of claim 12, wherein said bio-gasoline fraction comprises:
(i) a total oxygen content of less than 15 weight percent, and
(ii) phenolic compounds in an amount of at least 10 percent by weight.

* * * * *